(12) United States Patent
Kobayashi et al.

(10) Patent No.: US 11,349,133 B2
(45) Date of Patent: May 31, 2022

(54) FUEL CELL

(71) Applicant: TOYOTA JIDOSHA KABUSHIKI KAISHA, Toyota (JP)

(72) Inventors: Masaya Kobayashi, Toyota (JP); Takuya Kurihara, Miyoshi (JP); Kenji Sato, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 17/069,835

(22) Filed: Oct. 13, 2020

(65) Prior Publication Data

US 2021/0202961 A1   Jul. 1, 2021

(30) Foreign Application Priority Data

Dec. 25, 2019   (JP) .............................. JP2019-233832

(51) Int. Cl.
*H01M 8/0247* (2016.01)
*H01M 8/1004* (2016.01)

(52) U.S. Cl.
CPC ....... *H01M 8/0247* (2013.01); *H01M 8/1004* (2013.01)

(58) Field of Classification Search
None
See application file for complete search history.

(56) References Cited

U.S. PATENT DOCUMENTS

| 2010/0055540 | A1* | 3/2010 | Sugiura | ................. | H01M 8/241 |
| | | | | | 429/434 |
| 2016/0133950 | A1 | 5/2016 | Okabe et al. | | |
| 2019/0198889 | A1* | 6/2019 | Nishida | ............... | H01M 8/1065 |
| 2020/0014041 | A1* | 1/2020 | Goto | ................... | H01M 8/0206 |

FOREIGN PATENT DOCUMENTS

| JP | 2016-091849 A | 5/2016 |
| JP | 2018-045882 A | 3/2018 |

* cited by examiner

*Primary Examiner* — Brian R Ohara
*Assistant Examiner* — Patrick Marshall Greene
(74) *Attorney, Agent, or Firm* — Hunton Andrews Kurth LLP (57) ABSTRACT

Provided is a fuel cell including: a membrane electrode-gas diffusion layer assembly including an electrolyte membrane; a sheet member; and a pair of separators. A first separator has a first projection that protrudes toward a side opposite from where the electrolyte membrane is disposed. A second separator has a second projection that protrudes toward a side opposite from where the electrolyte membrane is disposed. When seen from a direction perpendicular to the electrolyte membrane, the first projection and the second projection overlap at least part of the electrolyte membrane; the first projection has a first overlapping portion and a first non-overlapping portion; the second projection has a second overlapping portion and a second non-overlapping portion; the first projection is shaped so as to extend in a first longitudinal direction; and the second projection is shaped so as to extend in a second longitudinal direction intersecting the first longitudinal direction.

3 Claims, 11 Drawing Sheets

FUEL CELL

CROSS-REFERENCE TO RELATED APPLICATION

This application claims priority to Japanese Patent Application No. 2019-233832 filed on Dec. 25, 2019, incorporated herein by reference in its entirety.

BACKGROUND

1. Technical Field

This disclosure relates to a fuel cell.

2. Description of Related Art

Some fuel cells are formed by a stack of a plurality of fuel-cell single cells each composed of a membrane-electrode assembly that has an electrolyte membrane and a pair of separators that hold the membrane-electrode assembly from both sides. The stack is formed by fastening the fuel-cell single cells together so as to apply a load along the stacking direction. If the separators deform under the load applied to the fuel-cell single cells, a pressure applied to a power generating region of the membrane-electrode assembly will vary, which may degrade the performance of the fuel cell. Japanese Patent Application Publication No. 2016-91849 (JP 2016-91849 A) describes a technique in which projections functioning as reinforcing portions for restricting deformation of separators are provided in parts of the separators, at positions overlapping the vicinity of a power generating region of a membrane-electrode assembly. The projections in each separator protrude toward a side opposite from where the membrane-electrode assembly is disposed. A surface of each separator opposite from a surface from which the projections protrude is depressed at portions corresponding to the positions of the projections.

SUMMARY

In one aspect of fuel cells, to retain an electrolyte membrane, a separator is joined to a peripheral edge portion of the electrolyte membrane through a thermoplastic sheet member. When the temperature of the membrane-electrode assembly rises accompanying power generation of the fuel cell, the sheet member undergoes thermal expansion. When power generation ends and the temperature of the membrane-electrode assembly decreases, the sheet member contracts. A part of the electrolyte membrane that is joined to the sheet member expands and moves along with the sheet member as the sheet member expands, and contracts and moves along with the sheet member as the sheet member contracts. Meanwhile, a part of the electrolyte membrane that is not joined to the sheet member does not expand and move along with the sheet member as the sheet member expands, nor contract and move along with the sheet member as the sheet member contracts. This results in a deviation in the relative positions of the part of the electrolyte membrane that expands, contracts, and moves as the sheet member expands and contracts and the part thereof that does not expand, contract, and move along with the sheet member, which may cause wrinkling or tearing of the electrolyte membrane at a border portion between these parts. In the technique of JP 2016-91849 A, portions of the electrolyte membrane are not joined to the sheet member for the following reasons.

A separator and an electrolyte membrane are joined together through a sheet member as follows: A heated die is pressed against a region of the separator that is in contact with the sheet member to temporarily melt the sheet member, and then the sheet member is cooled and solidified to join the separator and the electrolyte membrane together. The heated die is not pressed against those portions of the separator at which the projections are located. The portions of the separator at which the projections are located are depressed on the side where the electrolyte membrane is disposed. Therefore, even when the separator is pressed by the die toward the electrolyte membrane, those portions of the sheet member that face the depressions of the separator are not pressed against the electrolyte membrane. This means that the portions of the electrolyte membrane corresponding to the positions of the projections of the separator are not joined to the sheet member. As a result, wrinkling or tearing of the electrolyte membrane may occur at a border portion between a portion that is joined to the sheet member and expands, contracts, and moves along with the sheet member and a portion that is not joined to the sheet member and does not expand, contract, and move along with the sheet member.

This disclosure can be implemented in the following forms.

(1) A fuel cell including: a membrane electrode-gas diffusion layer assembly including an electrolyte membrane; a frame-shaped sheet member that is made of a thermoplastic resin and bonded to a peripheral edge portion of one surface of the electrolyte membrane; and a pair of separators that hold the membrane electrode-gas diffusion layer assembly and the sheet member between the pair of separators. A first separator of the pair of separators has a first projection that protrudes toward a side opposite from where the electrolyte membrane is disposed and that is depressed on a side facing the electrolyte membrane. A second separator of the pair of separators has a second projection that protrudes toward a side opposite from where the electrolyte membrane is disposed and that is depressed on a side facing the electrolyte membrane. When seen from a direction perpendicular to the electrolyte membrane, the first projection and the second projection overlap at least part of the electrolyte membrane; the first projection has a first overlapping portion that overlaps the second projection and a first non-overlapping portion that does not overlap the second projection; the second projection has a second overlapping portion that overlaps the first projection and a second non-overlapping portion that does not overlap the first projection; the first projection is shaped so as to extend in a first longitudinal direction; and the second projection is shaped so as to extend in a second longitudinal direction intersecting the first longitudinal direction. Compared with a fuel cell in which a first projection and a second projection coincide with each other when seen from a direction perpendicular to an electrolyte membrane, the fuel cell having the above aspect has the following advantages: The area of overlap between the first projection and the second projection that are both depressed on the side facing the electrolyte membrane is small. Therefore, the area of a portion of the sheet member that is not fixed by the separator is also small. Accordingly, a portion of the electrolyte membrane that does not expand, contract, and move along with the sheet member as the temperature of the sheet member changes accompanying power generation of the membrane-electrode assembly can be reduced in size or eliminated. As a result, the risk of wrinkling or tearing of the electrolyte membrane due to temperature changes of the sheet member can be reduced.

(2) In one form of this disclosure, the first projection may have a first flat part that is parallel to a surface of the electrolyte membrane and extends along the first longitudinal direction; the second projection may have a second flat part that is parallel to a surface of the electrolyte membrane and extends along the second longitudinal direction; and the fuel cell may be configured such that when a plurality of fuel cells is stacked, the first flat part of one of adjacent fuel cells and the second flat part of the other one of the adjacent fuel cells partially come into contact with each other. When a plurality of fuel cells having this aspect is stacked, a portion of one of adjacent separators at which the first projection is not provided and a portion of the other one of the adjacent separators at which the second projection is not provided can be kept at a distance from each other in a direction perpendicular to the electrolyte membrane in a part where the first flat part and the second flat part are in contact with each other. Further, when a plurality of sets of a pair of separators holding an electrolyte membrane, a first diffusion layer, a second diffusion layer, and a sheet member between the pair of separators is stacked and compressed, the load can be borne by the first overlapping portion and the second overlapping portion. Compared with an aspect in which the first projection and the second projection do not overlap each other, this aspect makes the separator less prone to warping deformation.

(3) In one form of this disclosure, the longitudinal direction of the first projection may be inclined 8 degrees to 30 degrees relatively to the longitudinal direction of the second projection. In this aspect, the inclination angle is set to 8 degrees or larger, so that the first projection and the second projection are more likely to overlap each other even when a positional error occurs in placing two separators one on top of the other. Further, the inclination angle is set to 30 degrees or smaller, which allows a coolant flowing outside the membrane-electrode assembly to flow toward a central part of the membrane-electrode assembly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
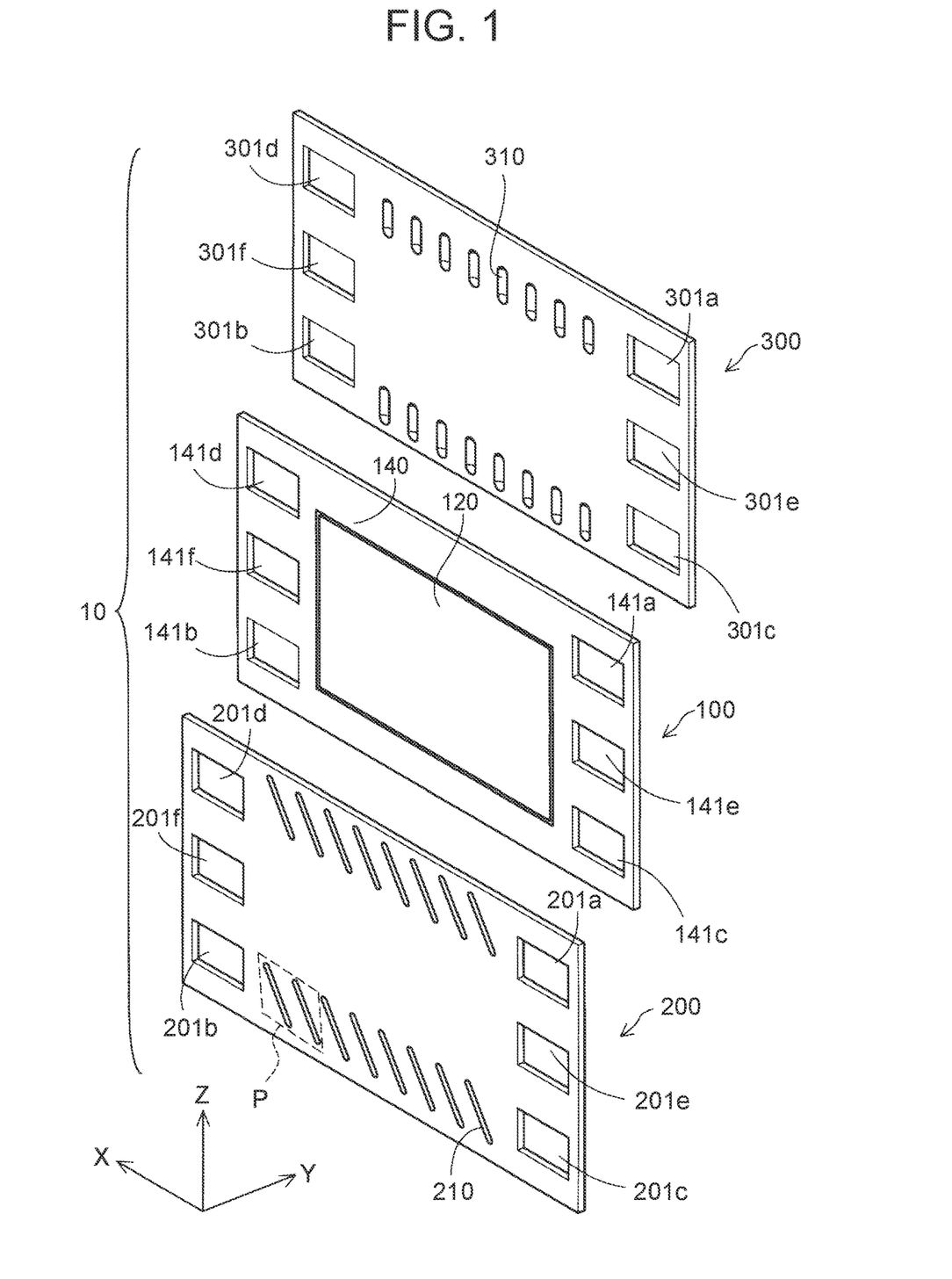
FIG. 1 is a perspective view showing a schematic configuration of a fuel cell as one embodiment of this disclosure.

FIG. 1 is a perspective view showing a schematic configuration of a fuel cell 10 as one embodiment of this disclosure. In FIG. 1, an X-axis, a Y-axis, and a Z-axis that are orthogonal to one another are shown. The X-axis, the Y-axis, and the Z-axis in the other drawings correspond to those in FIG. 1. In this embodiment, an "X-axis direction" collectively refers to a +X-direction and a −X-direction. Similarly, a "Y-axis direction" collectively refers to a +Y-direction and a −Y-direction, and a "Z-axis direction" collectively refers to a +Z-direction and a −Z-direction. The drawings are explanatory views for illustrating technical matters, and do not exactly represent the dimensions, angles, and shapes of the parts.

The fuel cell 10 includes a membrane electrode-gas diffusion layer assembly (MEGA) plate 100, a first separator 200, and a second separator 300. The fuel cell 10 is formed as the first separator 200 and the second separator 300 hold the MEGA plate 100 therebetween in the Y-axis direction. A plurality of fuel cells 10 is stacked in the Y-axis direction to form a fuel cell stack, which is used as a power source in a fuel cell vehicle.

The first separator 200 is in contact with the MEGA plate 100 on a −Y-side of the MEGA plate 100. The first separator 200 serves to supply a reactant gas to a cathode gas diffusion layer 120 of the adjacent MEGA plate 100 and discharge a cathode off-gas, discharged from the cathode gas diffusion layer 120, to an outside of the fuel cell 10. The cathode gas diffusion layer 120 will be described later. An electrically conductive material, such as metal or carbon, is used for the first separator 200.

The first separator 200 has, in peripheral edge portions thereof, a manifold opening 201a, a manifold opening 201b, a manifold opening 201c, a manifold opening 201d, a manifold opening 201e, and a manifold opening 201f that are bored through the first separator 200 in the Y-axis direction. Further, the first separator 200 is provided with a plurality of first projections 210 that is arrayed along longitudinal sides of the first separator 200. The first projections 210 will be described later.

The manifold opening 201a forms part of a cathode gas supply manifold that extends along the Y-axis direction inside a fuel cell stack. The manifold opening 201b forms part of a cathode off-gas discharge manifold that extends along a stacking direction inside a fuel cell stack when the fuel cell stack is formed.

The manifold opening 201c forms part of an anode gas supply manifold that extends along the Y-axis direction inside a fuel cell stack when the fuel cell stack is formed. The manifold opening 201d forms part of an anode off-gas discharge manifold that extends along the Y-axis direction inside a fuel cell stack when the fuel cell stack is formed.

The manifold opening 201e forms part of a cooling medium supply manifold that extends along the Y-axis direction inside a fuel cell stack when the fuel cell stack is formed. The manifold opening 201f forms part of a cooling medium discharge manifold that extends along the stacking direction inside a fuel cell stack when the fuel cells stack is formed.

The second separator 300 is in contact with the MEGA plate 100 on a +Y-side of the MEGA plate 100. The second separator 300 serves to supply a reactant gas to an anode gas diffusion layer 130 of the adjacent MEGA plate 100 and discharge an anode off-gas, discharged from the anode gas diffusion layer 130, to the outside of the fuel cell 10. The anode gas diffusion layer 130 will be described later. An electrically conductive material, such as metal or carbon, is used for the second separator 300.

The second separator 300 has, in peripheral edge portions thereof, a manifold opening 301a, a manifold opening 301b, a manifold opening 301c, a manifold opening 301d, a manifold opening 301e, and a manifold opening 301f that are bored through the second separator 300 in the Y-axis direction. Further, the second separator 300 is provided with a plurality of second projections 310 that is arrayed along longitudinal sides of the second separator 300. The second projections 310 will be described later.

The manifold openings 301a to 301f have the same functions as the manifold openings 201a to 201f, respectively, of the first separator 200.

Figure 2:
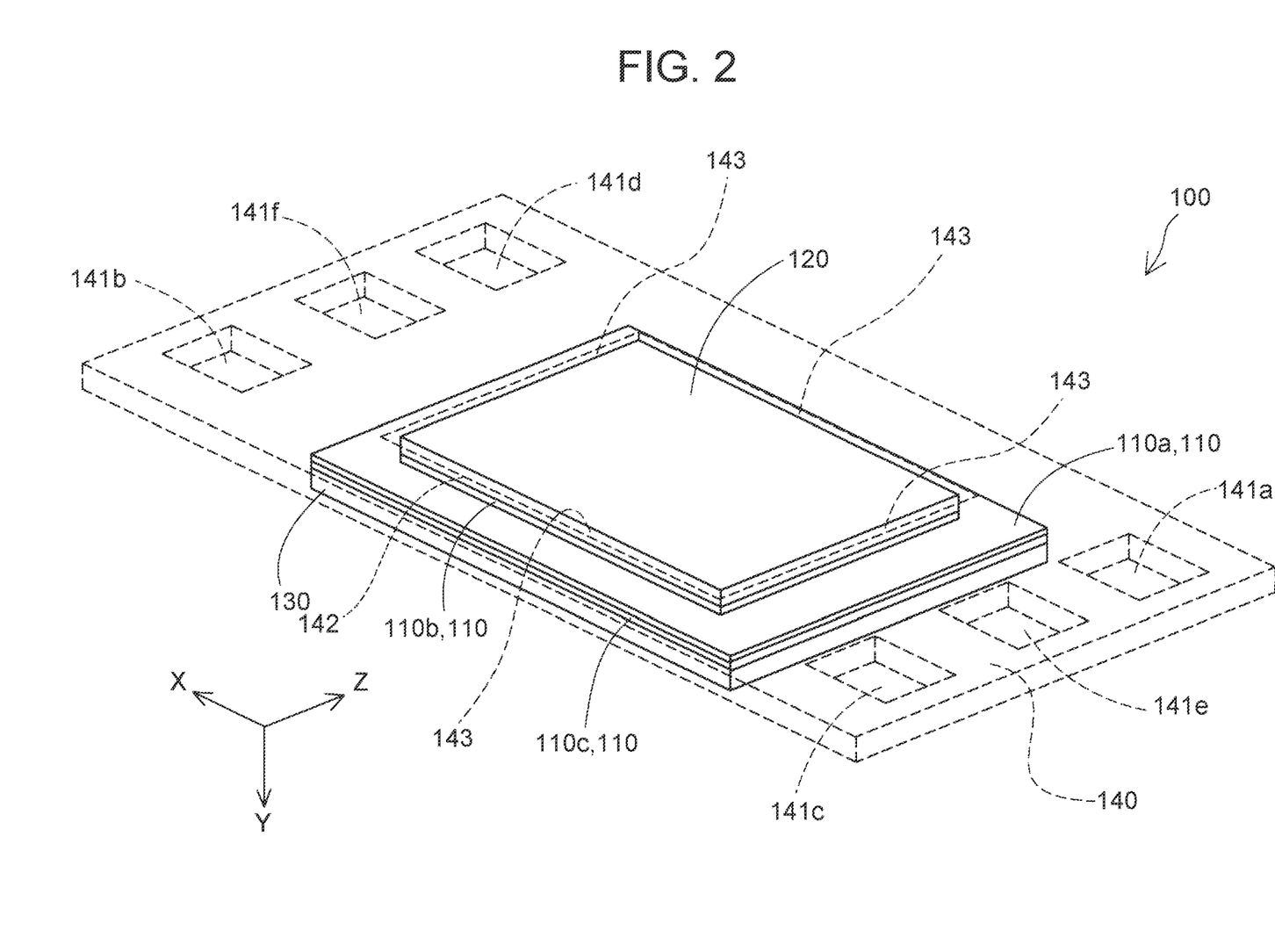
FIG. 2 is a perspective view showing a schematic configuration of an MEGA plate.

FIG. 2 is a perspective view showing a schematic configuration of the MEGA plate 100. To help understand the technique, a sheet member 140 of the MEGA plate 100 is indicated by dashed lines. As shown in FIG. 2, the MEGA plate 100 includes a membrane-electrode assembly 110, the cathode gas diffusion layer 120, the anode gas diffusion layer 130, and the sheet member 140.

The membrane-electrode assembly 110 is a power generating body that generates electricity by being supplied with a reactant gas from outside. The membrane-electrode assembly 110 is sandwiched between the cathode gas diffusion layer 120 and the anode gas diffusion layer 130. The membrane-electrode assembly 110 includes an electrolyte membrane 110a, a cathode catalyst layer 110b, and an anode catalyst layer 110c.

The electrolyte membrane 110a is a proton-conducting ion-exchange membrane made of a solid polymer material, for example, a fluorine resin. The cathode catalyst layer 110b is a reaction field where a cathode-side electrode reaction progresses, and includes a catalyst that promotes the electrode reaction near a surface in contact with the electrolyte membrane 110a. The cathode catalyst layer 110b is in contact with part of one surface of the electrolyte membrane 110a. More specifically, the dimensions of the cathode catalyst layer 110b in the X-axis direction and the Z-axis direction are smaller than the dimensions of the electrolyte membrane 110a in the X-axis direction and the Z-axis direction. The cathode catalyst layer 110b is disposed at a central part of the electrolyte membrane 110a.

The anode catalyst layer 110c is a reaction field where an anode-side electrode reaction progresses, and like the cathode catalyst layer 110b, includes a catalyst near a surface in contact with the electrolyte membrane 110a. The anode catalyst layer 110c is in contact with the other surface of the electrolyte membrane 110a. The dimensions of the anode catalyst layer 110c in the X-axis direction and the Z-axis direction are equal to the dimensions of the electrolyte membrane 110a in the X-axis direction and the Z-axis direction.

The cathode gas diffusion layer 120 supplies a cathode gas, introduced from outside, to the cathode catalyst layer 110b. The cathode gas is a gas containing oxygen. In this embodiment, the cathode gas is air. The cathode gas diffusion layer 120 is in contact with a surface of the cathode catalyst layer 110b opposite from a surface thereof in contact with the electrolyte membrane 110a. The dimensions of the cathode gas diffusion layer 120 in the X-axis direction and the Z-axis direction are equal to the dimensions of the cathode catalyst layer 110b in the X-axis direction and the Z-axis direction. Carbon cloth formed by non-woven fabric, or carbon paper, for example, can be used as the cathode gas diffusion layer 120. Alternatively, a resin or metal porous body can be used as the cathode gas diffusion layer 120.

The anode gas diffusion layer 130 supplies an anode gas, introduced from outside, to the anode catalyst layer 110c. In this embodiment, the anode gas is a hydrogen gas. The anode gas diffusion layer 130 is in contact with a surface of the anode catalyst layer 110c opposite from a surface thereof in contact with the electrolyte membrane 110a. In this embodiment, the dimensions of the anode diffusion layer in the X-axis direction and the Z-axis direction are equal to the dimensions of the cathode catalyst layer 110b in the X-axis direction and the Z-axis direction. As with the cathode gas diffusion layer 120, carbon cloth formed by non-woven fabric, or carbon paper, for example, can be used as the anode gas diffusion layer 130. Alternatively, a resin or metal porous body can be used.

Figure 3:
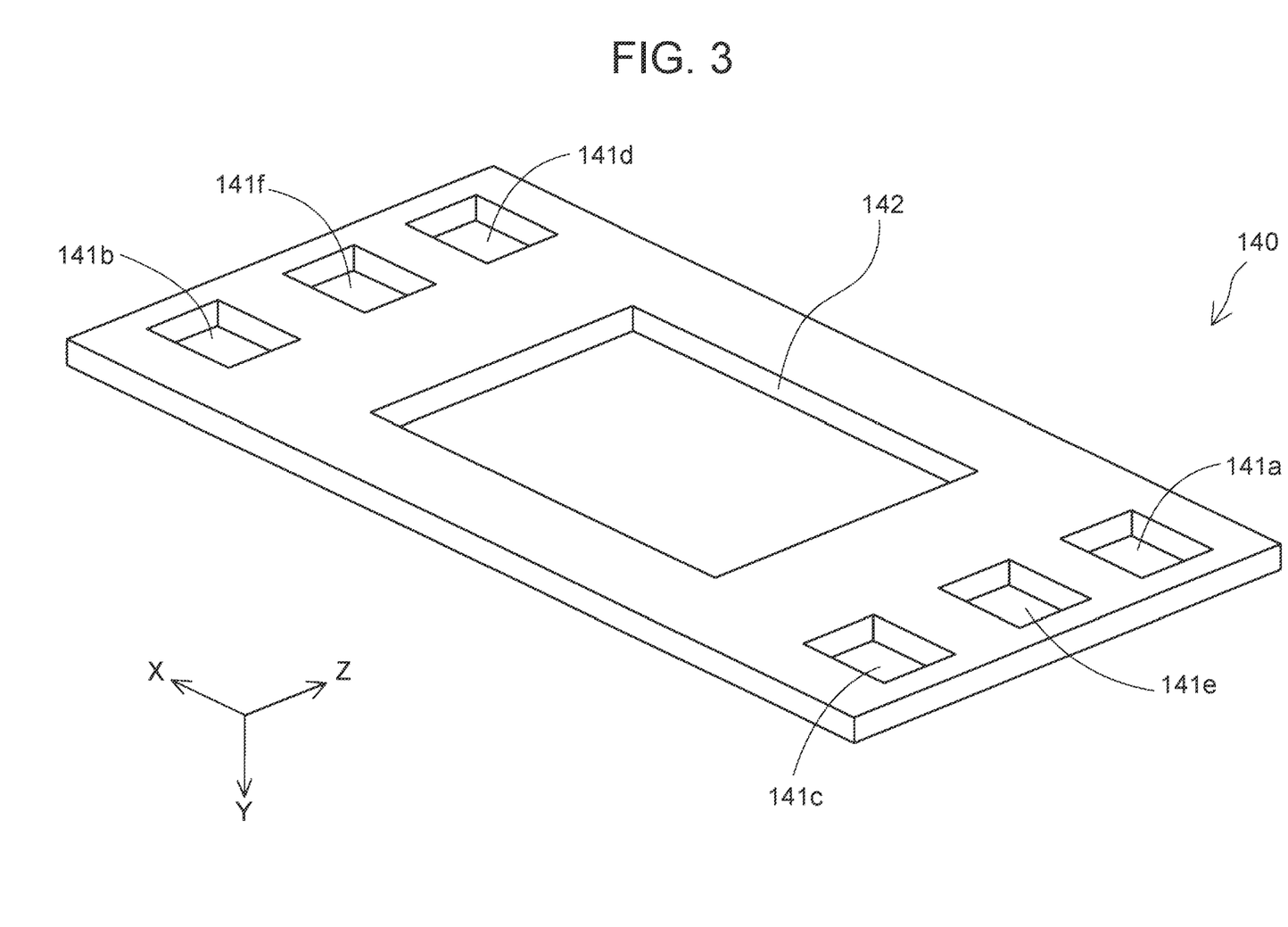
FIG. 3 is a perspective view illustrating a sheet member.

FIG. 3 is a perspective view illustrating the sheet member 140. The sheet member 140 fixes a peripheral edge portion of the membrane-electrode assembly 110. The sheet member 140 is a frame-shaped member with a rectangular outline. The sheet member 140 is made of a thermoplastic resin.

The sheet member 140 has, in peripheral edge portions thereof, a manifold opening 141a, a manifold opening 141b, a manifold opening 141c, a manifold opening 141d, a manifold opening 141e, and a manifold opening 141f that are bored through the sheet member 140 in the Y-axis direction. Further, the sheet member 140 has a MEGA opening 142 bored through a central part thereof in the Y-axis direction.

The manifold openings 141a to 141f have the same functions as the manifold openings 201a to 201f, respectively, of the first separator 200.

In a state where the membrane-electrode assembly 110, the cathode gas diffusion layer 120, the anode gas diffusion layer 130, and the sheet member 140 are joined together, the cathode catalyst layer 110b and the cathode gas diffusion layer 120 that are located on the −Y-side of the electrolyte membrane 110a are housed in the MEGA opening 142 (see FIG. 2). The depth of the MEGA opening 142 in the Y-axis direction is approximately equal to the combined thickness of the cathode catalyst layer 110b and the cathode gas diffusion layer 120 in the Y-axis direction. The dimensions of the MEGA opening 142 in the X-axis direction and the Z-axis direction are larger than the dimensions of the cathode catalyst layer 110b and the cathode gas diffusion layer 120 in the X-axis direction and the Z-axis direction. Thus, a MEGA gap 143 is left between the cathode catalyst layer 110b and the cathode gas diffusion layer 120 on one side and the MEGA opening 142 on the other side (indicated at four positions in FIG. 2).

A part of the sheet member 140 that forms an outer periphery of the MEGA opening 142 is disposed on a part of the electrolyte membrane 110a that is not in contact with the cathode catalyst layer 110b. Although this is not shown, the sheet member 140 and the electrolyte membrane 110a are bonded together with an adhesive that is applied in a shape of a frame surrounding the cathode catalyst layer 110b and the cathode gas diffusion layer 120 on the electrolyte membrane 110a.

Figure 4:
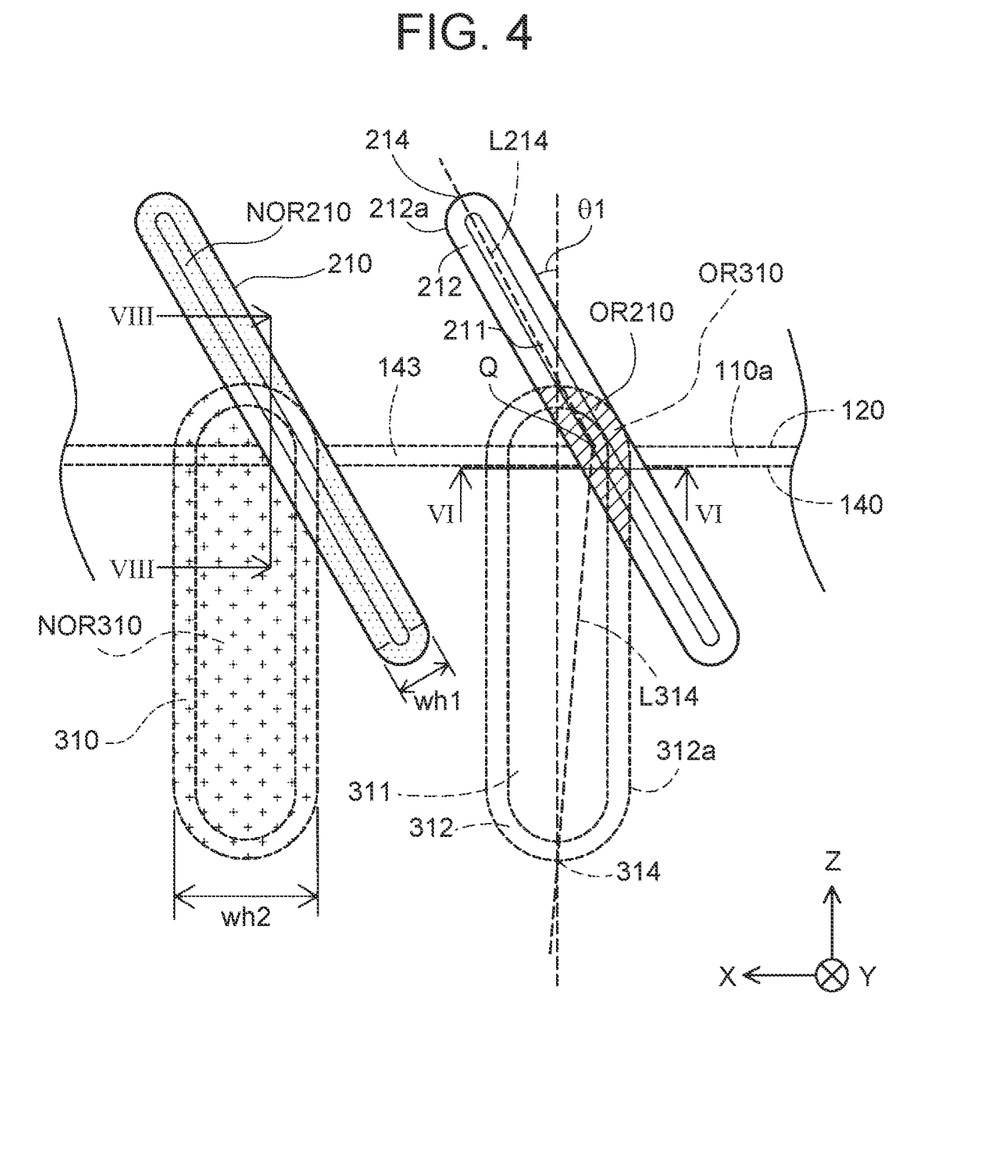
FIG. 4 is a schematic view of the part inside the dashed box of FIG. 1, as seen in a +Y-direction.

FIG. 4 is a schematic view of the inside of a region P indicated by the dashed box in FIG. 1, as seen in the +Y-direction. To help understand the technique, the components of the MEGA plate 100 and those of the second separator 300 are indicated by dashed lines.

The first projection 210 in the first separator 200 protrudes toward a side opposite from where the membrane-electrode assembly 110 is disposed, and is depressed on a side facing the membrane-electrode assembly 110. The first projection 210 is shaped so as to extend along a longitudinal direction of the first projection 210. The first projection 210 forms a cavity on the side facing the membrane-electrode assembly 110. When the electrolyte membrane 110a is seen in the +Y-direction, the first projection 210 overlaps at least part of the electrolyte membrane 110a. As shown in FIG. 4, the first projection 210 has a first flat part 211 and a first side wall 212.

The first flat part 211 forms an upper wall of the first projection 210. The first flat part 211 is a flat-plate-shaped part surrounded by two opposite sides that extend in the longitudinal direction and are parallel to each other and by substantially semicircular portions that connect these two sides to each other at both ends. The first flat part 211 is parallel to a surface of the electrolyte membrane 110a and is shaped so as to extend along the longitudinal direction of the first projection 210.

The first side wall 212 forms a wall of the first projection 210. The first side wall 212 has a first outer edge 212a. The first outer edge 212a is an outer edge surrounded by two opposite sides that extend in the longitudinal direction and are parallel to each other and by substantially semicircular portions that connect these two sides to each other at both ends. The dimensions of the first outer edge 212a in the longitudinal direction and a width direction are larger than the dimensions of the first flat part 211 in the longitudinal direction and the width direction. The first side wall 212 is formed such that the dimensions thereof in the longitudinal direction and the width direction decrease from the first outer edge 212a toward an outer edge of the first flat part 211.

The second projection 310 in the second separator 300 protrudes toward a side opposite from where the membrane-electrode assembly 110 is disposed, and is depressed on a side facing the membrane-electrode assembly 110. The second projection 310 is shaped so as to extend along a longitudinal direction of the second projection 310. The longitudinal direction of the second projection 310 intersects the longitudinal direction of the first projection 210. The longitudinal direction of the second projection 310 is parallel to the Z-axis direction. When the electrolyte membrane 110a is seen in the +Y-direction, the second projection 310 overlaps at least part of the electrolyte membrane 110a. The second projection 310 has a second flat part 311 and a second side wall 312. The second side wall 312 has a second outer edge 312a.

The second flat part 311 is parallel to a surface of the electrolyte membrane 110a and shaped so as to extend along the longitudinal direction of the second projection 310. The second flat part 311, the second side wall 312, and the second outer edge 312a have the same functions as the first flat part 211, the first side wall 212, and the first outer edge 212a, respectively.

A direction perpendicular to the longitudinal direction of the first projection 210 will be referred to as a width direction of the first projection 210. Similarly, a direction perpendicular to the longitudinal direction of the second projection 310 will be referred to as a width direction of the second projection 310. The dimension of the first flat part 211 in the longitudinal direction is smaller than the dimension of the second flat part 311 in the longitudinal direction. The dimension of the first flat part 211 in the width direction is smaller than the dimension of the second flat part 311 in the width direction. A width dimension wh1 of the first projection 210 is smaller than a width dimension wh2 of the second projection 310. The first projection 210 is formed such that the longitudinal direction of the first projection 210 has an inclination θ1 relative to the longitudinal direction of the second projection 310. In this embodiment, θ1 is 30 degrees.

When the electrolyte membrane 110a is seen in the +Y-direction, the first projection 210 has a first overlapping portion OR210 that overlaps the second projection 310. Further, the first projection 210 has a first non-overlapping portion NOR210 that does not overlap the second projection 310. The first non-overlapping portion NOR210 refers to the portion of the first projection 210 other than the first overlapping portion OR210. To help understand the technique, in the two first projections 210 shown in FIG. 4, the first overlapping portion OR210 is indicated by hatching in the first projection 210 on the −X-side while the first non-overlapping portion NOR210 is indicated by hatching in the first projection 210 on the +X-side.

When the electrolyte membrane 110a is seen in the +Y-direction, the second projection 310 has a first overlapping portion OR310 that overlaps the first projection 210. Further, the second projection 310 has a second non-overlapping portion NOR310 that does not overlap the first projection 210. The second non-overlapping portion NOR310 refers to the portion of the second projection 310 other than the second overlapping portion OR310. To help understand the technique, in the two second projections 310 shown in FIG. 4, the second overlapping portion OR310 is indicated by hatching in the second projection 310 on the −X-side while the second non-overlapping portion NOR310 is indicated by hatching in the second projection 310 on the +X-side.

With the electrolyte membrane 110a seen in the +Y-direction, a line connecting a center of gravity Q of the second overlapping portion OR310 and one end 314 of ends of the second projection 310 in the longitudinal direction that is farther from the second overlapping portion OR310 is indicated as line L314 in FIG. 4. Further, with the electrolyte membrane 110a seen in the +Y-direction, a line connecting a center of gravity Q of the first overlapping portion OR210 and one end 214 of ends of the first projection 210 in the longitudinal direction that is farther from the first overlapping portion OR210 is indicated as line L214 in FIG. 4. The line L314 and the line L214 are not parallel to each other but intersect each other.

Figure 5:
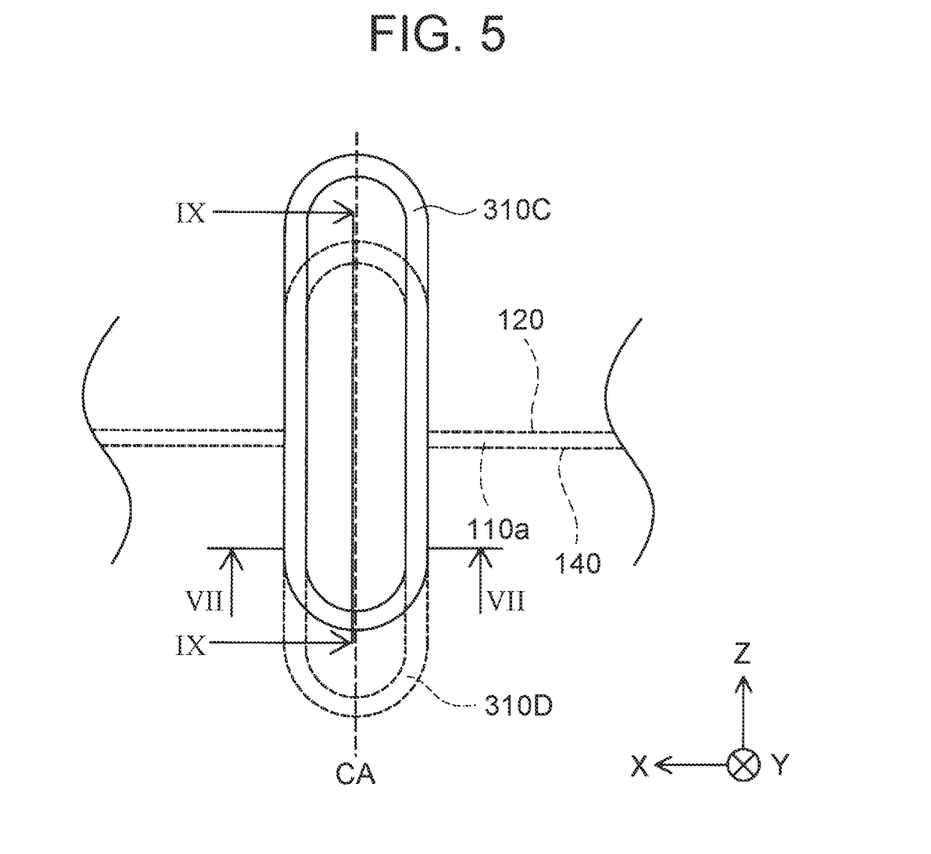
FIG. 5 is a view illustrating a fuel cell of a comparative example.

FIG. 5 is a view illustrating a fuel cell of a comparative example. FIG. 5 corresponds to FIG. 4. As shown in FIG. 5, in the comparative example, a first separator and a second separator holding the MEGA plate 100 therebetween have a projection 310C and a projection 310D, respectively, each of which has the same shape as the second projection 310 of the embodiment. The projection 310C and the projection 310D are disposed at such relative positions that central axes CA extending along longitudinal directions thereof coincide with each other. In the comparative example, joining the electrolyte membrane 110a and the sheet member 140 together is not taken into account, but appropriately bearing the load during stacking and compressing of a plurality of fuel cells is. Therefore, the projection 310C and the projection 310D are disposed so as to have a large area of overlap in the longitudinal direction and the width direction.

Figure 6:
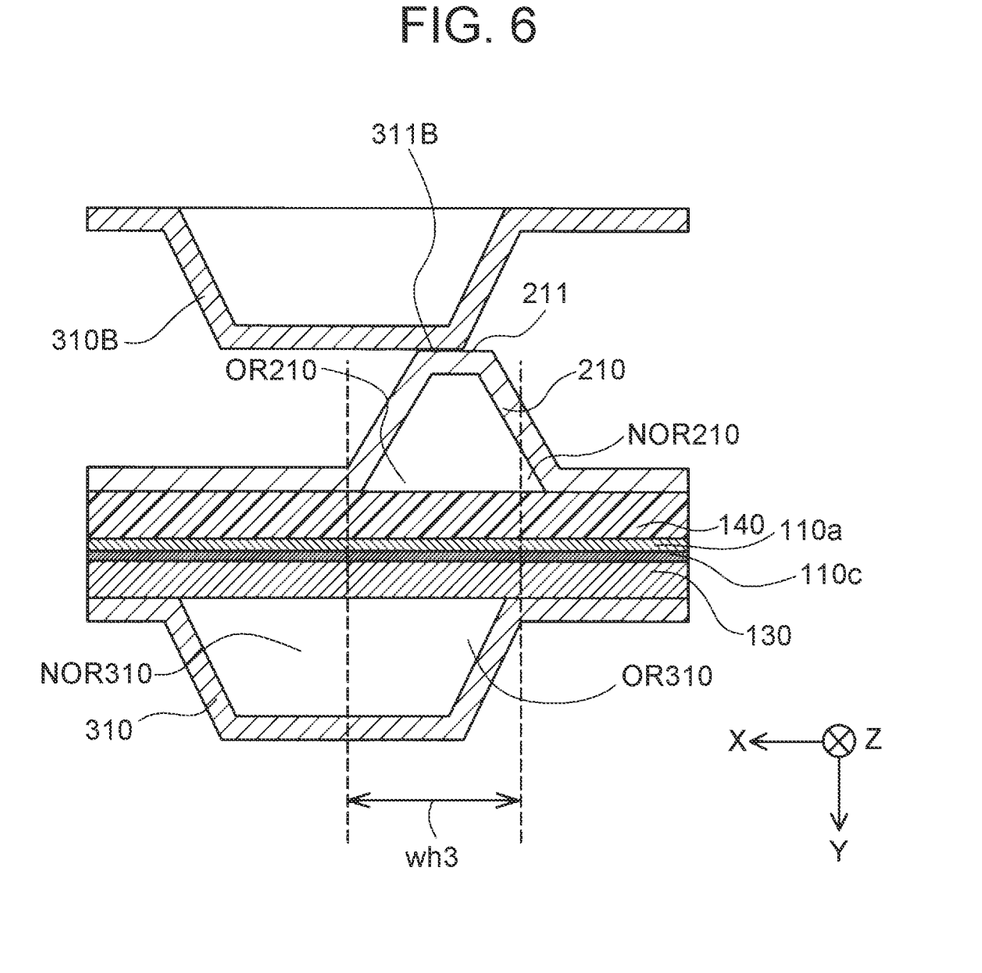
FIG. 6 is an end view taken along line VI-VI in FIG. 4.
Figure 7:
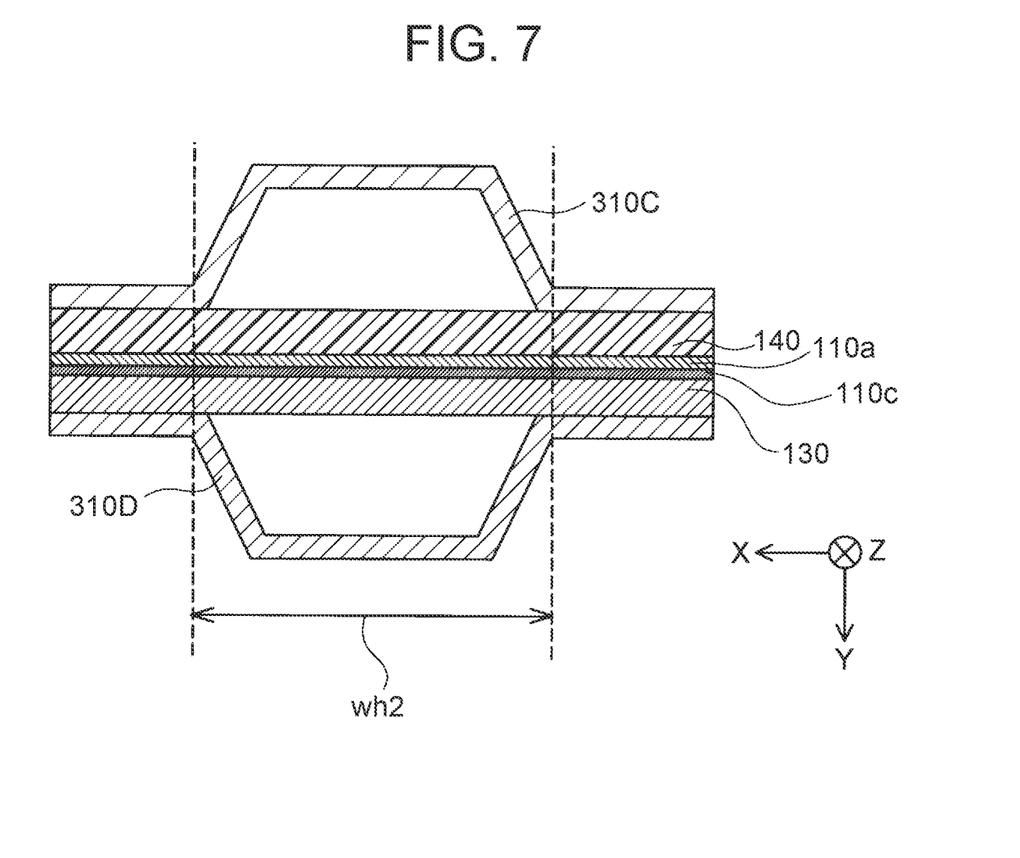
FIG. 7 is an end view taken along line VII-VII in FIG. 5.

FIG. 6 is an end view taken along line VI-VI in FIG. 4. FIG. 7 is an end view taken along line VII-VII in FIG. 5. FIG. 7 corresponds to FIG. 6. Those components of the comparative example shown in FIG. 5 and FIG. 7 that correspond to the components of the fuel cell 10 of the embodiment are denoted by the same reference signs as the components of the fuel cell 10 of the embodiment.

The dimension of the first overlapping portion OR210 and the second overlapping portion OR310 in the X-axis direction in FIG. 6 is a dimension wh3. Since the projection 310C and the projection 310D of FIG. 5 are disposed at such relative positions that the central axes CA extending along the longitudinal directions thereof coincide with each other, as shown in FIG. 7, the dimension of an overlapping portion between the projection 310C and the projection 310D in the X-axis direction is equal to the width dimension wh2 of the projection 310C (see FIG. 7). The dimension wh3 is smaller than the dimension wh2 (see FIG. 6 and FIG. 7).

Figure 8:
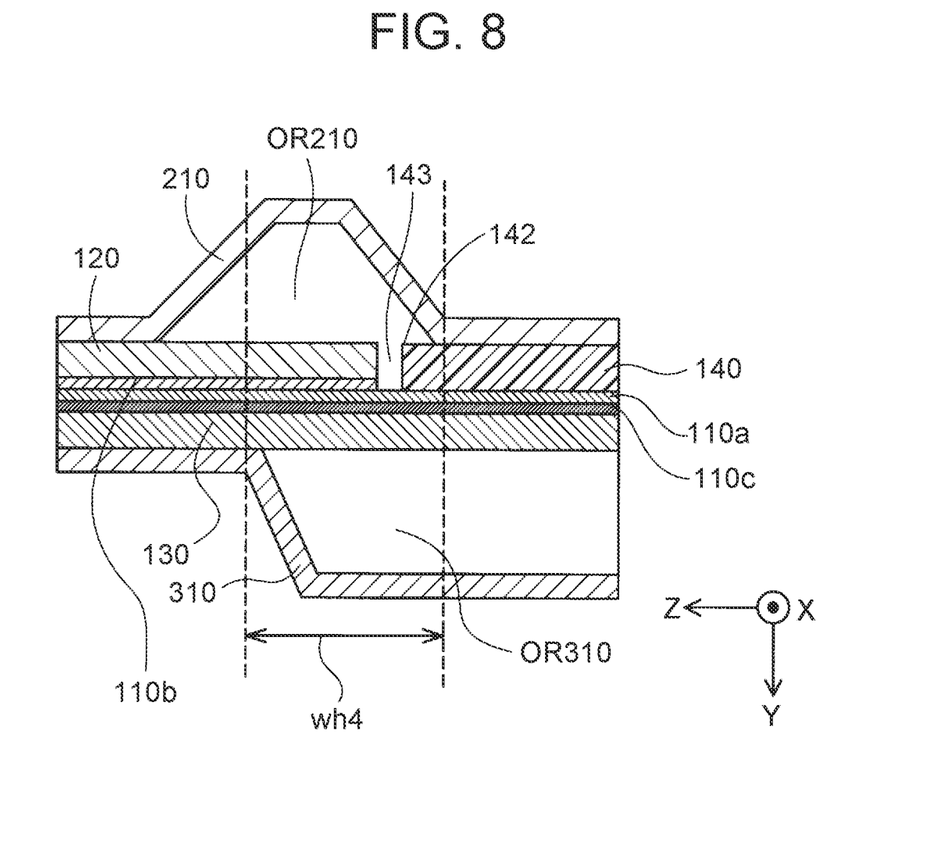
FIG. 8 is an end view taken along line VIII-VIII in FIG. 4.
Figure 9:
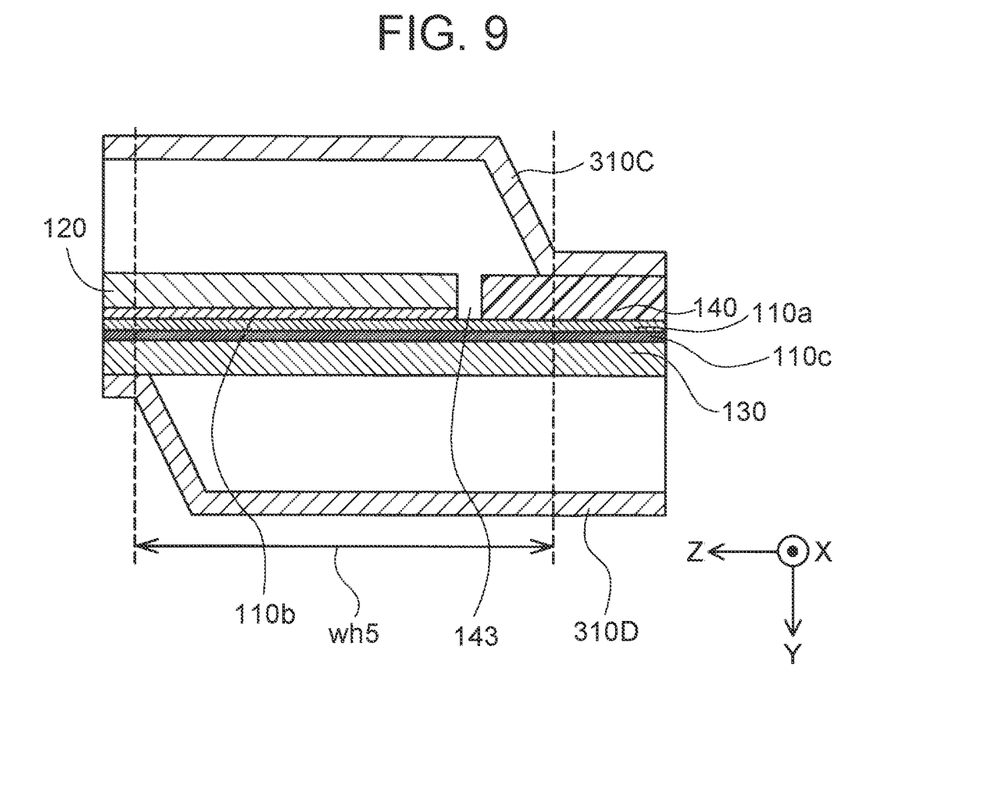
FIG. 9 is an end view taken along line IX-IX in FIG. 5.

FIG. 8 is an end view taken along line VIII-VIII in FIG. 4. FIG. 9 is an end view taken along line IX-IX in FIG. 5. FIG. 9 corresponds to FIG. 8. Those components of the comparative example shown in FIG. 9 that correspond to the components of the fuel cell 10 of the embodiment are denoted by the same reference signs as the components of the fuel cell 10 of the embodiment. As shown in FIG. 8, the dimension of the first overlapping portion OR210 and the second overlapping portion OR310 in the Z-axis direction is a dimension wh4. As shown in FIG. 9, the dimension of the overlapping portion between the projection 310C and the projection 310D in the Z-axis direction is a dimension wh5. As described above, the projection 310C and the projection 310D of the comparative example are disposed so as to have a large area of overlap in the longitudinal direction and the width direction. By contrast, the first projection 210 is disposed so as have the inclination θ1 relative to the longitudinal direction of the second projection 310. Thus, the dimension wh4 is smaller than the dimension wh5 (see FIG. 8 and FIG. 9).

In the comparative example, a membrane-electrode assembly having an electrolyte membrane with a sheet member bonded thereto is sandwiched between a pair of separators, and then heat is applied to the separators using a die to join the separators and the membrane-electrode assembly together by thermocompression bonding. Heating by the die is performed on the part of a surface of each separator other than the projections. When a membrane-electrode assembly is sandwiched between separators having symmetrical shapes with respect to the electrolyte membrane, heat from the die is more likely to be conducted to a part of the sheet member that is placed on the part of each separator other than the projections. Thus, the part of the sheet member that is placed on the part of each separator other than the projections is melted by heat. The melted sheet member can flow. A part of the electrolyte membrane that is in contact with the melted sheet member moves easily relatively to the separator along with the sheet member.

On the other hand, heat from the die is less likely to be conducted to a part of the sheet member that is located where the projections of the pair of separators overlap each other, so that this part of the sheet member hardly melts. Accordingly, a part of the electrolyte membrane that is in contact with this part of the sheet member hardly moves. In this way, a part that moves easily and a part that hardly moves occur in one electrolyte membrane. When the part of the electrolyte membrane that moves easily is moved by an external force, tearing of the electrolyte membrane may occur between that part and the part that hardly moves.

In this embodiment, as described above, the width dimension wh1 of the first projection 210 is smaller than the width dimension wh2 of the second projection 310 (see FIG. 4). Thus, the first overlapping portion OR210, i.e., the second overlapping portion OR310 becomes thinner than in an aspect in which the width dimension wh1 of the first projection 210 is equal to the width dimension wh2 of the second projection 310. Even when the relative positions of the first projection 210 and the second projection 310 deviate from the positions shown in FIG. 4 as a result of assembly, the first overlapping portion OR210, i.e., the second overlapping portion OR310 assumes an elongated shape.

Therefore, during thermocompression bonding using a die, heat is more likely to be conducted from a surrounding area to a portion of the sheet member 140 that corresponds to the positions of the first overlapping portion OR210 and the second overlapping portion OR310. This can reduce the likelihood of occurrence of a part of the electrolyte membrane 110a that hardly moves, and thereby the likelihood of tearing of the electrolyte membrane 110a.

The longitudinal direction of the first projection 210 has the inclination θ1 relative to the longitudinal direction of the second projection 310 (see FIG. 4). Thus, the first overlapping portion OR210 and the second overlapping portion OR310 become smaller than those of a comparative example in which the longitudinal direction of the first projection 210 is not inclined relatively to the longitudinal direction of the second projection 310.

Further, when the electrolyte membrane 110a is seen in the +Y-direction, the areas of the first overlapping portion OR210 and the second overlapping portion OR310 are smaller than the area of the overlapping portion between the projection 310C and the projection 310D of the comparative example in which the central axes of the projection 310C and the projection 310D extending along the longitudinal directions coincide with each other (see FIG. 4 and FIG. 5). Moreover, the dimensions of the first overlapping portion OR210 and the second overlapping portion OR310 in the longitudinal direction and the width direction are smaller than the dimensions of the projection 310C and the projection 310D in the longitudinal direction and the width direction (see FIG. 6 and FIG. 7, and FIG. 8 and FIG. 9).

Thus, heat is more likely to be conducted from a surrounding area to those parts of the first overlapping portion OR210 and the second overlapping portion OR310 that are farthest away from outer peripheries of the first projection 210 and the second projection 310. Therefore, a part of the sheet member 140 to which heat is less likely to be conducted during thermocompression bonding of the first separator 200 and the second separator 300 to the MEGA plate 100 using a die is reduced in size or eliminated. Accordingly, a part of the electrolyte membrane 110a that hardly moves during thermocompression bonding of the first separator 200 and the second separator 300 is reduced in size or eliminated. As a result, the likelihood of tearing of the electrolyte membrane 110a between the part of the electrolyte membrane 110a that hardly moves and the part thereof that moves easily can be reduced. When heat is conducted from the sheet member 140, not only the electrolyte membrane 110a but also the adhesive that bonds the electrolyte membrane 110a moves along with the electrolyte membrane 110a.

Since the areas of the first overlapping portion OR210 and the second overlapping portion OR310 are small, the area of a part of the sheet member 140 that is not fixed by the separators is also small. Thus, a part of the electrolyte membrane 110a that does not expand, contract, and move along with the sheet member 140 as the temperature of the sheet member 140 changes accompanying power generation of the membrane-electrode assembly 110 can be reduced in size or eliminated. As a result, the risk of wrinkling or tearing of the electrolyte membrane 110a due to temperature changes of the sheet member 140 can be reduced.

The present inventors found that particularly a part of the electrolyte membrane 110a that is located at the MEGA gap 143 is prone to tearing. The likelihood of tearing of particularly the part of electrolyte membrane 110a that is located at the MEGA gap 143 can be reduced by making the part of the sheet member 140 to which heat is less likely to be conducted during thermocompression bonding smaller as described above.

As shown in FIG. 6, the first flat part 211 is configured such that when a plurality of fuel cells 10 is stacked, the first flat part 211 of one of adjacent fuel cells 10 and a second flat part 311B of the other one of the adjacent fuel cells 10 partially come into contact with each other. Thus, when a plurality of fuel cells 10 is stacked, a portion of the first separator 200, which is one of adjacent separators, at which the first projection 210 is not provided and a portion of the other one of the adjacent separators at which a second projection 310B is not provided can be kept at a distance from each other in the direction perpendicular to the electrolyte membrane 110a in a part where the first flat part 211 and the second flat part 311B are in contact with each other. Further, when a plurality of sets of a pair of separators holding the electrolyte membrane 110a, the cathode gas diffusion layer 120, the anode gas diffusion layer 130, and the sheet member 140 therebetween is stacked and compressed, the load can be borne by the first overlapping portion OR210 and the second overlapping portion OR310. Compared with an aspect in which the first projection 210 and the second projection 310 do not overlap each other, this aspect makes the separators less prone to warping deformation.

The relative positions of adjacent fuel cells 10 may deviate in the X-axis direction due to an assembly error in stacking a plurality of fuel cells 10. In the case of the fuel cell of the comparative example in which the central axes of the projection 310C and the projection 310D extending along the longitudinal directions coincide with each other, this deviation can lead to a situation where the opposite projection 310C and projection 310D of adjacent fuel cells do not overlap each other at all. In the embodiment, the longitudinal direction of the first projection 210 has the inclination θ1 relative to the longitudinal direction of the second projection 310 (see FIG. 4). Thus, even when the relative positions of adjacent fuel cells 10 deviate in the X-axis direction or the Z-axis direction, this deviation is unlikely to lead to a situation where the first projection 210 and the second projection 310 have no overlapping portion.

B. Second Embodiment

Figure 10:
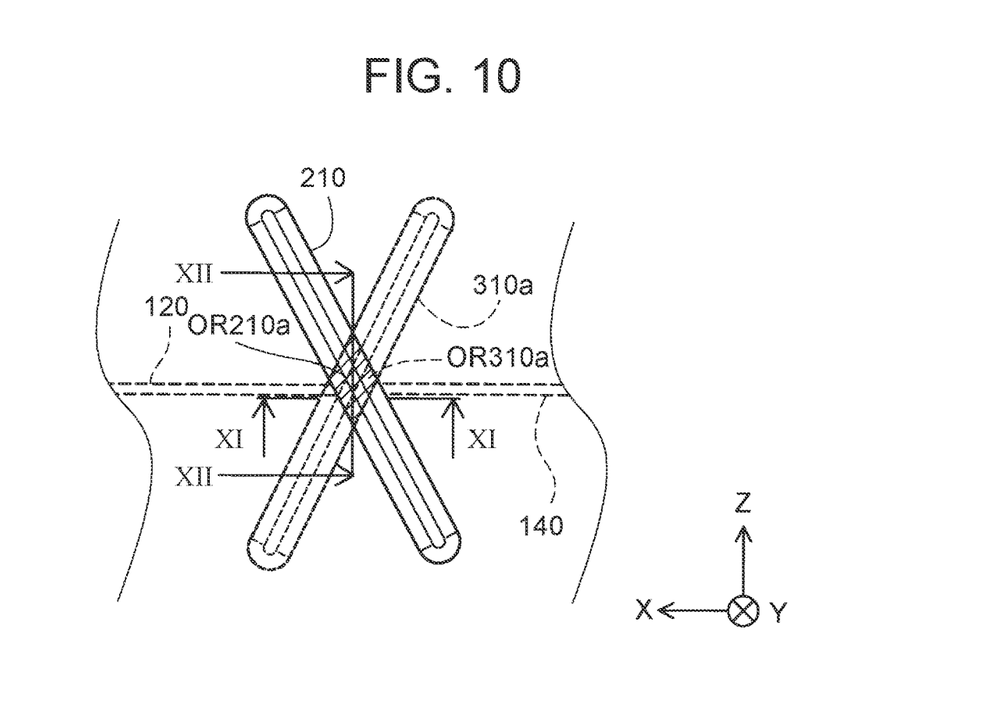
FIG. 10 is a schematic view of a fuel cell in a second embodiment as seen in the +Y-direction.

FIG. 10 is a schematic view of a fuel cell 10a of a second embodiment as seen in the +Y-direction. FIG. 10 corresponds to FIG. 4. The configuration of the fuel cell 10a of the second embodiment differs from that of the fuel cell 10 of the first embodiment in that a second separator 300a has the same shape as the first separator 200, and that the first projection 210 and a second projection 310a overlap each other as shown in FIG. 10 when the first separator 200 and the second separator 300a hold the MEGA plate 100 therebetween. As the configuration of the fuel cell 10a of the second embodiment is otherwise the same as that of the fuel cell 10 of the first embodiment, the same components will be denoted by the same reference signs and will not be described in detail.

As shown in FIG. 10, the first projection 210 and the second projection 310a are disposed such that longitudinal directions thereof intersect each other when the fuel cell 10a is seen in the +Y-direction.

Figure 11:
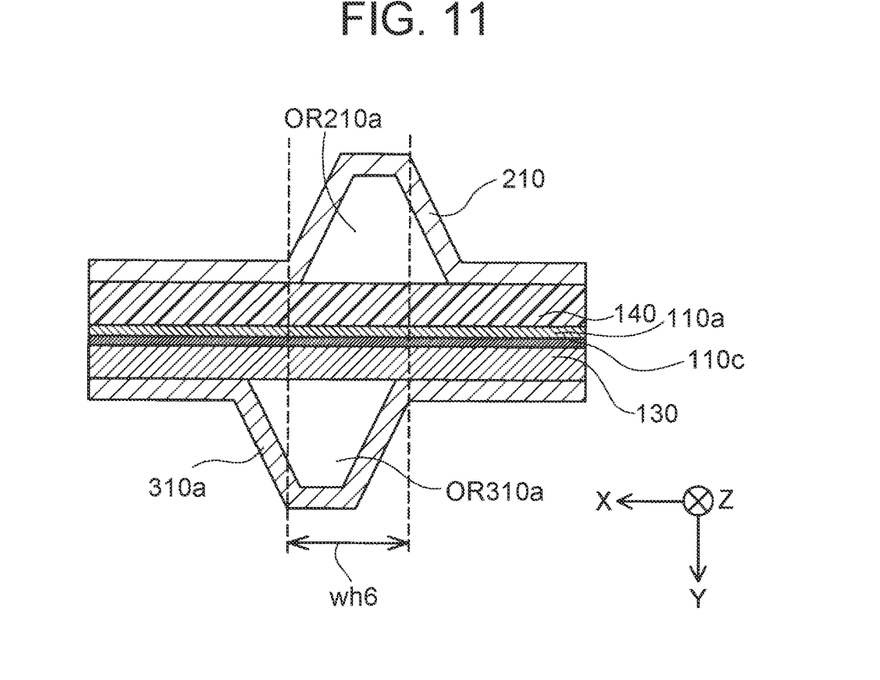
FIG. 11 is an end view taken along line XI-XI in FIG. 10.

FIG. 11 is an end view taken along line XI-XI in FIG. 10. When the first separator 200 and the second separator 300a hold the membrane-electrode assembly 110 therebetween, a width wh6 in the X-axis direction of an overlapping part between a first overlapping portion OR210a and a second overlapping portion OR310a is smaller than the dimension wh2 along the X-axis of the comparative example in which the projection 310C and the projection 310D coincide with each other (see FIG. 7 and FIG. 11).

Figure 12:
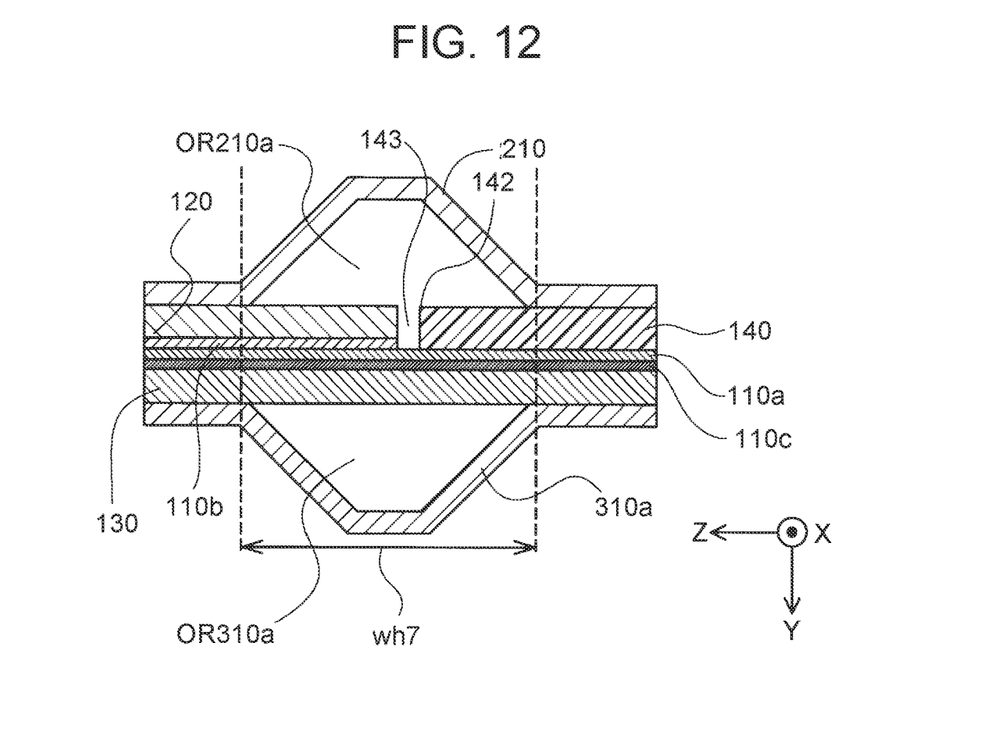
FIG. 12 is an end view taken along line XII-XII in FIG. 10.

FIG. 12 is an end view taken along line XII-XII in FIG. 10. As described above, the projection 310C of the first separator and the projection 310D of the second separator in the comparative example are disposed so as to have a large area of overlap in the longitudinal direction and the width direction. By contrast, the first separator 200 and the second separator 300a are disposed such that the longitudinal directions thereof intersect each other. Thus, a dimension wh7 along the Z-axis of the overlapping part between the first overlapping portion OR210a and the second overlapping portion OR310a is smaller than the dimension wh5 along the Z-axis in the case where the projections coincide with each other (see FIG. 9 and FIG. 12).

When the electrolyte membrane 110a is seen in the +Y-direction, the areas of the first overlapping portion OR210a and the second overlapping portion OR310a are smaller than the area of the overlapping portion in the fuel cell of the comparative example in which the central axes CA of the projection 310C and the projection 310D extending along the longitudinal directions coincide with each other (see FIG. 5 and FIG. 10). Moreover, as described above, the dimensions of the first overlapping portion OR210a and the second overlapping portion OR310a in the longitudinal direction and the width direction are smaller than the dimensions of the projection 310C and the projection 310D in the longitudinal direction and the width direction (see FIG. 7 and FIG. 11, and FIG. 9 and FIG. 12).

Also in the second embodiment, therefore, a part of the sheet member 140 to which heat is less likely to be conducted during thermocompression bonding of the first separator 200 and the second separator 300a to the MEGA plate 100 using a die is reduced in size. Thus, the likelihood of tearing of the electrolyte membrane 110a can be reduced.

Moreover, a part of the electrolyte membrane 110a that does not expand, contract, and move along with the sheet member 140 as the temperature of the sheet member 140 changes accompanying power generation of the membrane-electrode assembly 110 can be reduced in size or eliminated. As a result, also in the second embodiment, the risk of wrinkling or tearing of the electrolyte membrane 110a due to temperature changes of the sheet member 140 can be reduced.

Further, since the longitudinal directions of the first projection 210 and the second projection 310a intersect each other, deviation in the relative positions of adjacent fuel cells 10a in the X-axis direction or the Z-axis direction is unlikely to lead to a situation where the first projection 210 and the second projection 310a have no overlapping portion.

The first separator 200 can be used as substitute for the second separator 300a, and thus the first separator 200 can be used as both separators that make a pair. This eliminates the need for distinguishing between the first separator 200 and the second separator 300a when the membrane-electrode assembly 110 is sandwiched. As a result, the fuel cell 10a can be easily manufactured.

C. Third Embodiment

Figure 13:
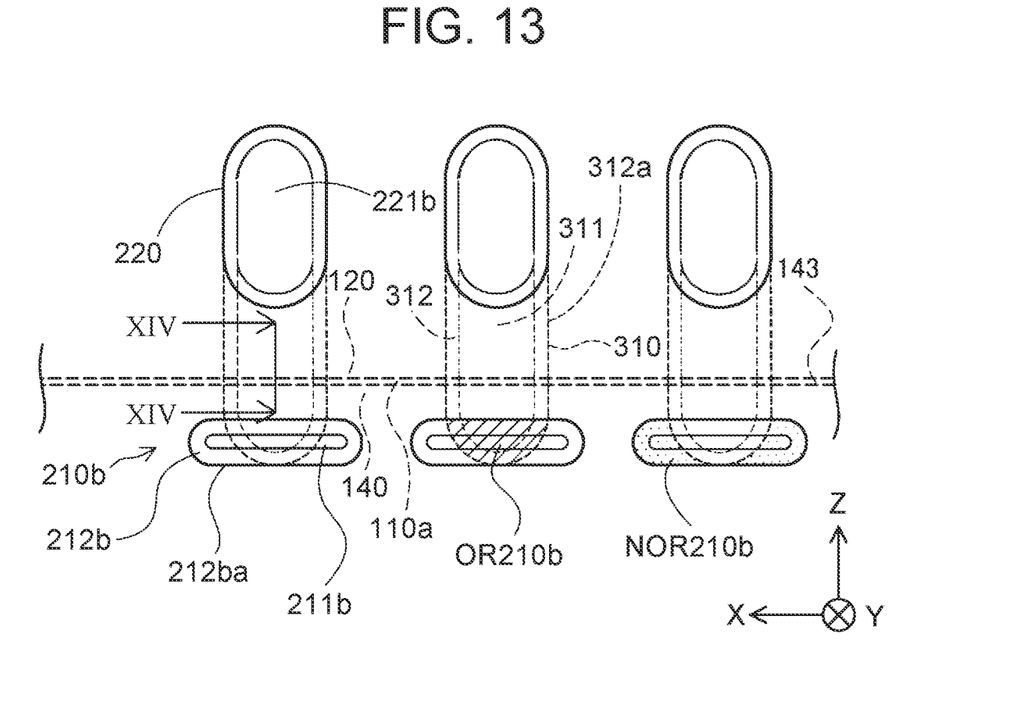
FIG. 13 is a schematic view of a fuel cell in a third embodiment as seen in the +Y-direction.

FIG. 13 is a schematic view of a fuel cell 10b of a third embodiment as seen in the +Y-direction. FIG. 13 corresponds to FIG. 4. In the configuration of the fuel cell 10b of the third embodiment, the shape and arrangement of first projections 210b of a first separator 200b are different from those of the first projections 210 of the first embodiment. The first separator 200b of the fuel cell 10b of the third embodiment additionally has third projections 220. As the configuration of the fuel cell 10b of the third embodiment is otherwise the same as that of the fuel cell 10 of the first embodiment, the same components will be denoted by the same reference signs and will not be described in detail.

As shown in FIG. 13, the first separator 200b has the first projections 210b and the third projections 220. The first projection 210b in the first separator 200b protrudes toward the side opposite from where the membrane-electrode assembly 110 is disposed, and is depressed on the side facing the membrane-electrode assembly 110. The first projection 210b forms a cavity on the side facing the membrane-electrode assembly 110. The first projection 210b has a first flat part 211b and a first side wall 212b. The first side wall 212b has a first outer edge 212ba. The first flat part 211b, the first side wall 212b, and the first outer edge 212ba have the same functions as the first flat part 211, the first side wall 212, and the first outer edge 212a, respectively, of the first embodiment.

The dimensions of the first flat part 211b in a longitudinal direction and a width direction are smaller than the dimensions of the second flat part 311 in the longitudinal direction and the width direction. The width dimension of the first outer edge 212ba is smaller than the width dimension wh2 of the second outer edge 312a.

The longitudinal direction of the first projection 210b is orthogonal to the longitudinal direction of the second projection 310. The first projection 210b is provided at a position closer to one of four sides forming the outline of the first separator 200b that extends along a longitudinal direction of the first separator 200b than the third projection 220 to be described later is.

The first projection 210b has a first overlapping portion OR210b that overlaps the second projection 310 when seen from the direction perpendicular to the electrolyte membrane 110a. Further, the first projection 210b has a first non-overlapping portion NOR210b that is a portion that does not overlap the second projection 310 when the electrolyte membrane 110a is seen in the +Y-direction. The first non-overlapping portion NOR2010b is the portion other than the first overlapping portion OR210b. In the three first projections 210b shown in FIG. 12, the first overlapping portion OR210b is indicated by hatching in the first projection 210b at the center while the first non-overlapping portion NOR210b is indicated by hatching in the first projection 210b farthest on the −X side.

When seen from the direction perpendicular to the electrolyte membrane 110a, the third projection 220 overlaps part of the second projection 310 in the longitudinal direction and the width direction. The longitudinal direction of the third projection 220 is parallel to the longitudinal direction of the second projection 310. The dimension of the third projection 220 in the longitudinal direction is smaller than the dimension of the second projection 310 in the longitudinal direction. A direction perpendicular to the longitudinal direction of the third projection 220 will be referred to as a width direction of the third projection 220. The width dimension of the third projection 220 is equal to the width dimension wh2 of the second projection 310. The third projection 220 has a third flat part 221b. The third flat part 221b has the same function as the first flat part 211b.

Figure 14:
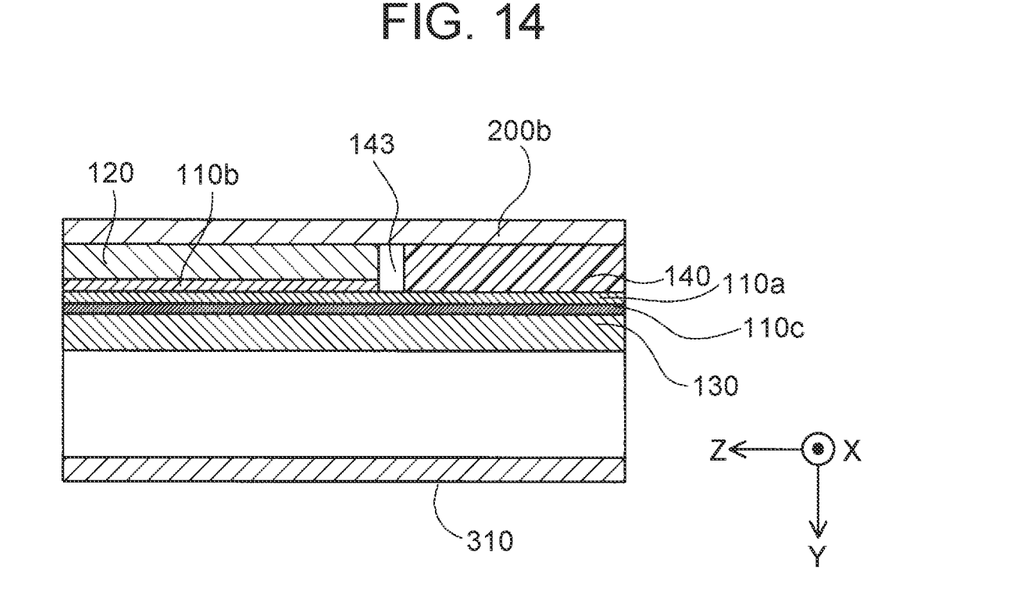
FIG. 14 is an end view taken along line XIV-XIV in FIG. 13.

FIG. 14 is an end view taken along line XIV-XIV in FIG. 13. As shown in FIG. 14, the second projection 310 overlaps the MEGA gap 143. However, the first projection 210b does not overlap the MEGA gap 143. During thermocompression bonding using a die, the die comes into contact with a portion of the surface of the first separator 200b between the first projection 210b and the third projection 220 to heat the sheet member 140. As a result, heat is more likely to be conducted to the sheet member 140 during thermocompression boding using a die, which can reduce the likelihood of tearing of the electrolyte membrane 110a at the MEGA gap 143 that is where the electrolyte membrane 110a is prone to tearing.

As in the first embodiment, when a plurality of fuel cells 10b is stacked, the first flat part 211b of one of adjacent fuel cells 10b and the second flat part of the other one of the adjacent fuel cells 10b partially come into contact with each other. Thus, when a plurality of fuel cells 10b is stacked, a portion of one of adjacent separators at which the first projection 210b is not provided and a portion of the other one of the adjacent separators at which the second projection is not provided can be kept at a distance from each other in the direction perpendicular to the electrolyte membrane 110a in a part where the first flat part 211b and the adjacent second flat part are in contact with each other. Moreover, in the third embodiment, the third flat part 221b, in addition to the first flat part 211b, partially comes into contact with the second flat part of the other one of the adjacent fuel cells 10b. Thus, the two portions can be kept at a distance from each other more reliably than when the third projection 220 is not provided.

The cathode catalyst layer 110b is also called a "first catalyst layer." The anode catalyst layer 110c is also called a "second catalyst layer." The cathode gas diffusion layer 120 is also called a "first diffusion layer." The anode gas diffusion layer 130 is also called a "second diffusion layer." The longitudinal direction of the first projection is also called a "first longitudinal direction." The longitudinal direction of the second projection is also called a "second longitudinal direction." Seeing the electrolyte membrane 110a in the +Y-direction is also called "seeing the electrolyte membrane 110a from a direction perpendicular to the electrolyte membrane 110a."

D. Other Embodiments (D1) In the above embodiments, the dimensions of the anode catalyst layer 110c along the X-axis and the Z-axis are equal to the dimensions of the electrolyte membrane 110a along the X-axis and the Z-axis. However, the dimensions of the anode catalyst layer along the X-axis and the Z-axis may be different from the dimensions of the electrolyte membrane along the X-axis and the Z-axis, for example, smaller than those dimensions.

(D2) In the above embodiments, θ1 is 30 degrees. The inclination angle θ1 is set to a value other than zero, preferably within the range from 8 degrees to 30 degrees. When the inclination angle is set to 8 degrees or larger, the first projection and the second projection are more likely to overlap each other even when a positional error occurs in placing two separators one on top of the other. Further, when the inclination angle is set to 30 degrees or smaller, a coolant flowing outside the membrane-electrode assembly is allowed to flow toward a central part of the membrane-electrode assembly.

(D3) In the third embodiment, the longitudinal direction of the first projection 210b is orthogonal to the longitudinal direction of the second projection 310. However, the longitudinal direction of the first projection 210b may, for example, intersect the longitudinal direction of the second projection 310.

(D4) In the third embodiment, the longitudinal direction of the third projection 220 is parallel to the longitudinal direction of the second projection 310. However, the longitudinal direction and the width direction of the third projection may, for example, intersect the longitudinal direction and the width direction of the second projection.

(D5) In the above embodiments, the cathode catalyst layer 110b is also called a "first catalyst layer," and the anode catalyst layer 110c is also called a "second catalyst layer." However, for example, the anode catalyst layer may be called a "first catalyst layer," and the cathode catalyst layer may be called a "second catalyst layer."

(D6) In the above embodiments, the first separator 200 is adjacent to the cathode gas diffusion layer 120. The second separator 300 is adjacent to the anode gas diffusion layer 130. However, for example, the first separator may be adjacent to the anode gas diffusion layer and the second separator may be adjacent to the cathode gas diffusion layer.

(D7) In the third embodiment, the first projection 210b is provided at a position closer to one of the four sides forming the outline of the first separator 200b that extends along the longitudinal direction thereof than the third projection 220 is. However, for example, the third projection may be provided at a position closer to one of the four sides forming the outline of the first separator 200b that extends along the longitudinal direction thereof than the first projection is.

(D8) In the third embodiment, the width dimension of the third projection 220 is equal to the width dimension wh2 of the second projection 310. However, the width dimension of the third projection may be an arbitrary dimension, for example, a larger dimension than the width dimension of the second projection 310.

This disclosure is not limited to the above embodiments but can be implemented in various configurations within the scope of the gist of the disclosure. For example, to solve part or the whole of the above-described problem or to achieve some or all of the above-described advantages, the technical features of the embodiments corresponding to the technical features of the forms described in the section SUMMARY can be substituted or combined as appropriate. Any of these technical features that are not described as essential in this specification can be omitted as appropriate.

What is claimed is:

1. A fuel cell comprising:
a membrane electrode-gas diffusion layer assembly including an electrolyte membrane;
a frame-shaped sheet member that is made of a thermoplastic resin and bonded to a peripheral edge portion of one surface of the electrolyte membrane; and
a pair of separators that hold the membrane electrode-gas diffusion layer assembly and the sheet member between the pair of separators, wherein:
a first separator of the pair of separators has a first projection that protrudes toward a side opposite from where the electrolyte membrane is disposed and that is depressed on a side facing the electrolyte membrane;
a second separator of the pair of separators has a second projection that protrudes toward a side opposite from where the electrolyte membrane is disposed and that is depressed on a side facing the electrolyte membrane; and
when seen from a direction perpendicular to the electrolyte membrane,
the first projection and the second projection overlap at least part of the electrolyte membrane,
the first projection has a first overlapping portion that overlaps the second projection and a first non-overlapping portion that does not overlap the second projection,
the second projection has a second overlapping portion that overlaps the first projection and a second non-overlapping portion that does not overlap the first projection,
the first projection is shaped so as to extend in a first longitudinal direction, and
the second projection is shaped so as to extend in a second longitudinal direction intersecting the first longitudinal direction.

2. The fuel cell according to claim 1, wherein:
the first projection has a first flat part that is parallel to a surface of the electrolyte membrane and extends along the first longitudinal direction;
the second projection has a second flat part that is parallel to a surface of the electrolyte membrane and extends along the second longitudinal direction; and
the fuel cell is configured such that when a plurality of fuel cells is stacked, the first flat part of one of adjacent fuel cells and the second flat part of the other one of the adjacent fuel cells partially come into contact with each other.

3. The fuel cell according to claim 1, wherein the first longitudinal direction is inclined 8 degrees to 30 degrees relatively to the second longitudinal direction.

* * * * *